(12) United States Patent
Ionescu et al.

(10) Patent No.: US 12,040,439 B2
(45) Date of Patent: Jul. 16, 2024

(54) SILICON BATTERY AND METHOD FOR ASSEMBLY

(71) Applicant: ionobell, Inc., San Jose, CA (US)

(72) Inventors: Robert C. Ionescu, San Jose, CA (US); Chueh Liu, San Jose, CA (US)

(73) Assignee: ionobell, Inc., San Jose, CA (US)

( * ) Notice: Subject to any disclaimer, the term of this patent is extended or adjusted under 35 U.S.C. 154(b) by 0 days.

(21) Appl. No.: 18/143,230

(22) Filed: May 4, 2023

(65) Prior Publication Data

US 2023/0307621 A1    Sep. 28, 2023

Related U.S. Application Data

(62) Division of application No. 17/964,698, filed on Oct. 12, 2022.

(60) Provisional application No. 63/254,868, filed on Oct. 12, 2021, provisional application No. 63/273,043, filed on Oct. 28, 2021.

(51) Int. Cl.
| | |
|---|---|
| *H01M 4/04* | (2006.01) |
| *H01M 4/38* | (2006.01) |
| *H01M 4/583* | (2010.01) |
| *H01M 4/62* | (2006.01) |
| *H01M 4/02* | (2006.01) |

(52) U.S. Cl.
CPC ......... *H01M 4/386* (2013.01); *H01M 4/0416* (2013.01); *H01M 4/0435* (2013.01); *H01M 4/0485* (2013.01); *H01M 4/583* (2013.01); *H01M 4/622* (2013.01); *H01M 4/625* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2,854,364 | A | 9/1958 | Anthony |
| 5,604,057 | A | 2/1997 | Nazri |
| 5,942,023 | A | 8/1999 | Bitler et al. |
| 6,060,680 | A | 5/2000 | Turner et al. |
| 7,087,346 | B2 | 8/2006 | Barker et al. |
| 7,097,939 | B2 | 8/2006 | Ferreira et al. |

(Continued)

FOREIGN PATENT DOCUMENTS

| | | |
|---|---|---|
| CN | 102976342 A | 3/2013 |
| CN | 104300125 A | 1/2015 |

(Continued)

OTHER PUBLICATIONS

"Applications of sodium carboxymethyl cellulose As a Binder In Batteries", Sidley Chem, dated Oct. 11, 2014, https://celluloseether.com/applications-sodium-carboxymethyl-cellulose-binder-batteries/.

(Continued)

*Primary Examiner* — Tracy M Dove
(74) *Attorney, Agent, or Firm* — Jeffrey Schox; Randy Mehlenbacher

(57) ABSTRACT

A method for forming a battery anode can include: forming a slurry including active material comprising silicon particles, wherein the silicon particles can be derived from silica fumes, depositing the slurry on an current collector, drying the deposited slurry to form a deposited film, and compacting the deposited film to form the battery anode.

7 Claims, 7 Drawing Sheets

(56) References Cited

U.S. PATENT DOCUMENTS

| | | |
|---|---|---|
| 8,012,676 B2 | 9/2011 | Yoshiki et al. |
| 9,666,855 B2 | 5/2017 | Voillequin et al. |
| 9,765,271 B2 | 9/2017 | Myrick |
| 10,147,950 B2 | 12/2018 | Sakshaug et al. |
| 10,263,249 B2 | 4/2019 | Kim et al. |
| 10,601,037 B2 | 3/2020 | Xia et al. |
| 10,608,254 B2 | 3/2020 | Sakshaug et al. |
| 10,658,659 B1 | 5/2020 | Mason et al. |
| 10,756,330 B2 | 8/2020 | Wang et al. |
| 10,763,501 B2 | 9/2020 | Feaver et al. |
| 10,777,807 B2 | 9/2020 | Haufe |
| 10,784,512 B2 | 9/2020 | Sakshaug et al. |
| 10,923,722 B2 | 2/2021 | Sakshaug et al. |
| 10,978,733 B2 | 4/2021 | Wegener et al. |
| 11,066,305 B1 | 7/2021 | Ionescu et al. |
| 11,133,493 B2 | 9/2021 | Sonntag et al. |
| 11,242,258 B1 | 2/2022 | Ionescu et al. |
| 11,437,621 B2 | 9/2022 | Sakshaug et al. |
| 11,532,818 B2 | 12/2022 | Zhang et al. |
| 11,584,653 B2 | 2/2023 | Ionescu et al. |
| 11,591,478 B2 | 2/2023 | Ionescu et al. |
| 2002/0025287 A1 | 2/2002 | Dastol et al. |
| 2005/0136330 A1 | 6/2005 | Mao et al. |
| 2008/0299455 A1 | 12/2008 | Shiozaki et al. |
| 2010/0133111 A1 | 6/2010 | Nocera et al. |
| 2011/0052475 A1 | 3/2011 | Barati et al. |
| 2012/0244436 A1 | 9/2012 | Kerlau |
| 2012/0315538 A1 | 12/2012 | Chiang et al. |
| 2013/0115512 A1 | 5/2013 | Jiang et al. |
| 2013/0189575 A1 | 7/2013 | Anguchamy et al. |
| 2013/0189579 A1 | 7/2013 | Darby et al. |
| 2013/0219704 A1 | 8/2013 | Haugseter et al. |
| 2014/0065492 A1 | 3/2014 | Komaba et al. |
| 2014/0272573 A1 | 9/2014 | Xiao et al. |
| 2015/0030912 A1 | 1/2015 | Nose et al. |
| 2015/0099187 A1 | 4/2015 | Cui et al. |
| 2015/0155538 A1 | 6/2015 | Tang et al. |
| 2016/0308205 A1 | 10/2016 | Canham et al. |
| 2016/0365568 A1 | 12/2016 | Haugseter et al. |
| 2017/0194631 A1 | 7/2017 | Favors et al. |
| 2017/0288231 A1 | 10/2017 | Yoon et al. |
| 2018/0013137 A1 | 1/2018 | Put et al. |
| 2018/0083272 A1 | 3/2018 | Son et al. |
| 2018/0097229 A1 | 4/2018 | Jo et al. |
| 2018/0309095 A1 | 10/2018 | Olchawski et al. |
| 2018/0342757 A1 | 11/2018 | Choi et al. |
| 2019/0097222 A1 | 3/2019 | Feaver et al. |
| 2019/0140258 A1 | 5/2019 | Burshtain et al. |
| 2019/0181440 A1 | 6/2019 | Park et al. |
| 2019/0252685 A1 | 8/2019 | Abusleme et al. |
| 2019/0267616 A1 | 8/2019 | Das Gupta et al. |
| 2019/0267617 A1 | 8/2019 | Evans et al. |
| 2019/0280298 A1 | 9/2019 | Sakshaug et al. |
| 2019/0326593 A1 | 10/2019 | Ozkan et al. |
| 2020/0020935 A1 | 1/2020 | Costantino et al. |
| 2020/0194749 A1 | 6/2020 | Ogata et al. |
| 2020/0313175 A1 | 10/2020 | Shin et al. |
| 2020/0313193 A1 | 10/2020 | Shin et al. |
| 2020/0335826 A1 | 10/2020 | Collins et al. |
| 2020/0358100 A1 | 11/2020 | Duong et al. |
| 2020/0373578 A1 | 11/2020 | Wang et al. |
| 2020/0388846 A1 | 12/2020 | Kim et al. |
| 2020/0395616 A1 | 12/2020 | Takahashi et al. |
| 2021/0005927 A1 | 1/2021 | Hoffert et al. |
| 2021/0057736 A1 | 2/2021 | Feaver et al. |
| 2021/0075055 A1 | 3/2021 | Duong et al. |
| 2021/0114886 A1 | 4/2021 | Rohani et al. |
| 2021/0143439 A1 | 5/2021 | Kim et al. |
| 2021/0175498 A1 | 6/2021 | Feaver et al. |
| 2021/0234173 A1 | 7/2021 | Wang et al. |
| 2021/0257621 A1 | 8/2021 | Spreafico et al. |
| 2021/0320320 A1 | 10/2021 | Yushin et al. |
| 2021/0344003 A1 | 11/2021 | Yushin et al. |
| 2022/0255071 A1 | 8/2022 | Ionescu et al. |
| 2022/0263082 A1 | 8/2022 | Ionescu et al. |
| 2022/0393162 A1 | 12/2022 | Ionescu et al. |
| 2023/0110918 A1 | 4/2023 | Ionescu et al. |
| 2023/0183076 A1 | 6/2023 | Ionescu et al. |
| 2023/0234854 A1 | 7/2023 | Ionescu et al. |

FOREIGN PATENT DOCUMENTS

| | | | |
|---|---|---|---|
| CN | 110828774 A | 2/2020 | |
| DE | 102016221782 A1 | 5/2018 | |
| DE | 102019213584 A1 | 3/2021 | |
| DE | 102019213585 A1 | 3/2021 | |
| EP | 1064982 A1 | 1/2001 | |
| TW | 201926779 A | 7/2019 | |
| WO | 2007102745 A1 | 9/2007 | |
| WO | WO-2015031445 A1 * | 3/2015 | ....... H01L 31/03762 |
| WO | 2022220685 A1 | 10/2022 | |

OTHER PUBLICATIONS

"Battery production—Density and Viscosity Quality Control of Battery Slurry Mixing and Coating Lines", Rheonics, https://rheonics.com/solutions-item/battery-production-slurry-mixing-and-coating/, first downloaded Jun. 22, 2022.

"Stability study of battery coating slurries", DataPhysics Instruments USA Corp., https://www.dataphysics-instruments.com/Downloads/Application_Note_MS_53_EN.pdf?v=1.0, first downloaded Jun. 22, 2022.

Fang, Chen, et al., "Organic Solvent Free Process to Fabricate High Performance Silicon/Graphite Composite Anode", J. Compos. Sci. 2021, 5, 188. https://doi.org/10.3390/jcs5070188.

Konda, Kumari, et al., "Optimization of Anode Slurry Preparation and Its Performance Evolution in Lithium-Ion Batteries", 2020 Meet. Abstr. MA2020-01 522.

Reynolds, Carl D., et al., "Rheology and Structure of Lithium-Ion Battery Electrode Slurries", Energy Technol. 2022, 10, 2200545.

Zheng, Honghe, et al., "Optimization of ratio and amount of CMC/SBR binder for a graphite anode", Abstract #200, 218th ECS Meeting, © 2010 The Electrochemical Society.

Ionescu, Robert C., et al., "System and Method for Silicon Material Manufacturing", U.S. Appl. No. 18/536,796, filed Dec. 12, 2023.

Ionescu, Robert C., et al., "Electronic Slurry and Method of Manufacture", U.S. Appl. No. 18/219,295, filed Jul. 7, 2023.

Kraytsberg, Alexander, et al., "Conveying Advanced Li-ion Battery Materials into Practice The Impact of Electrode Slurry Preparation Skills", Adv. Energy Mater., 2016, 6, 1500655.

Liu, Zhixiao, et al., "Mesoscale Elucidation of the Influence of Mixing Sequence in Electrode Processing", Langmuir 2014, 30, 15102-15113, dx.doi.org/10.1021/la5038469.

Wei, Congxiao, et al., "Small Molecule Slurry Additives for Si Alloy Coatings with CMC/SBR Binder", Journal of The Electrochemical Society, 166 (14) A3217-A3221 (2019).

Evonik, Aerosil—Fumed Silica—Technical Overview, 104 pages, downloaded Feb. 17, 2021.

Wikipedia definition for Porous Silicon, 8 pages.

Abboud, Jaafar, et al., "Developing of nano sized fibrous eutectic silicon in hypereutectic Al—Si alloy by laser remelting", Scientific Reports, (2020) 10:12090.

Andersen, Hanne Flaten, et al., "Silicon-Carbon composite anodes from industrial battery grade silicon", Scientific Reports (2019) 9:14814.

Bai, Yangzhi, et al., "A high-performance silicon/carbon composite as anode materials for lithium ion batteries", Nano Express 2(2021) 01021.

Ball, Philip, "Silicon seduced from silica: Synthetic silicon could be cheaper and more delicate", Nature, May 19, 2003, 2 pages.

Barbehenn, George H., et al., "Battery Conditioner Extends the Life of Li-Ion Batteries", Linear Technology Magazine, Dec. 2009, pp. 29-30.

Bux, Sabah, et al., "Nanostructured Bulk Silicon as an Effective Thermoelectric Material", Adv. Func. Mater. 2009, 19, 2445-2452.

Campbell, Brennan, et al., "Carbon-Coated, Diatomite-Derived Nanosilicon as a High Rate Capable Li-ion Battery Anode", Scientific Reports, 6: 33050, Oct. 7, 2016, 9 pages.

(56) References Cited

OTHER PUBLICATIONS

Choi, Insoo, et al., "Fading mechanisms of carbon-coated and disproportionated Is/SIOx negative electrode (SI/SiOx/C) in Li-ion secondary batteries: Dynamics and component analysis by TEM", Electrochimica Acta 85 (2012) 369-376.
Dai, Fang, et al., "Minimized Volume Expansion in Hierarchical Porous Silicon upon Lithiation", ACS Appl. Mater. Interfaces 2019, 11, pp. 13257-13263.
Darghouth, A., et al., "High Purity Porous Silicon Powder Synthesis by Magnesiothermic Reuction of Tunisina Silica Sand", Silicon, Research Gate, Apr. 2020, 11 pages.
Favors, Zachary, "Scalable Synthesis of Nano-Silicon from Beach San for Long Cycle Life Li-ion Batteries", Scientific Reports, 4: 5623, 7 pages, published Jul. 8, 2014.
Favors, Zachary, et al., "Towards Scalable Binderless Electrodes: Carbon Coated Silicon Nanofiber Paper via Mg Reduction of Electrospun SiO2 Nanofibers", Scientific Reports, 5: 8246, 7 pages, published Feb. 6, 2015.
Gauthier, Magali, et al., "A low-cost and high performance ball-milled S-based negative electrode for high energy Li-ion batteries", Energy Environ. Sci., 2013, 6, 2145-2155.
Gauthier, Magali, et al., "From SI-wafers to cheap and efficient Is electrodes for Li-ion batteries", Journal of Power Sources 256 (2014) 32-36.
Haregerwoin, Atetegeb Meazah, et al., "Electrolyte additives for lithium ion battery electrodes: progress and perspectives", The Royal Society of Chemistry 2016, Energy Environ. Sci. 2016, 9, 1955-1988.
Hossain, M.R., et al., "Probing the surfaces of core-shell and hollow nanoparticles by solvent relaxation NMR", MRC, vol. 56, Issue 4, Apr. 2018, pp. 251-256.
Hyung, Yoo E., et al., "Flame-retardant additives for lithium-ion batteries", Journal of Power Sources 119-121 (2003) 383-387.
Jang, Hee Dong, et al., "Aerosol-Assisted Extraction of Silicon Nanoparticles from Wafer Slicing Waste for Lithium Ion Batteries", Scientific Reports, 5 : 9431, Mar. 30, 2015.
Jia, Haiping, et al., "A novel approach to synthesize micrometer-sized porous silicon as a high performance anode for lithium-ion batteries", Nano Energy 50 (2018) pp. 589-597.
Kang, M., et al., "Intrinsically conductive polymer binders for electrochemical capacitor application", The Royal Society of Chemistry 2014, 4, 27939-27945.
Kim, Sang Woo, et al., "Current Collectors for Flexible Lithium Ion Batteries: A Review of Materials", J. Electrochemical. Sci. Techno. 6(1), 1-6 (2015).
Li, Qiuyan, et al., "Failure Analysis and Design Principles of Silicon-Based Lithium-Ion Batteries Using Micron-Sized Porous Silicon/Carbon Composite", SSRN, posted Jun. 30, 2022, https://papers.ssrn.com/sol3/papers.cfm? abstract_id=4150565.
Li, Changling, et al., "Silicon Derived from Glass Bottles as Anode Materials for Lithium Ion Full Cell Batteries", Scientific Reports, 7:917, 11 pages, published Apr. 19, 2017.
Lu, Yang, et al., "Cold welding of ultra thin gold nanowires", Nature Nanotechnology, vol. 5, Mar. 2010.
Maroni, Fabio, et al., "Near-Zero Volume Expansion Nanoporous Silicon as Anode for Li-ion Batteries", Journal of The Electrochemical Society, 2022 169 080506, published Aug. 8, 2022.
McBrayer, Josefine D., et al., "Calendar aging of silicon-containing batteries", Nature Energy, vol. 6, Sep. 2021, 866-872, www.nature.com/natureenergy.
Nguyen, Van At, et al., "Review-Conducting Polymer-Based Binders for Lithium-Ion Batteries and Beyond", Journal of the Electrochemical Society, 2020 167 065501.
Nzabahimana, Joseph, "Porous carbon-coated ball-milled silicon as high-performance anodes for lithium-ion batteries", J Master Sci (2019) 54: 4798-481; http://doi.org/10.1007/s10853-018-3164-9 p. 4801 para 2, Scheme 1; p. 4802 para 2; Figure 1(d).
Scheffler, Sören, et al., "Calendering of Silicon-Containing Electrodes and Their Influence on the Mechanical and Electrochemical Properties", Batteries 2022, 8, 46. https://doi.org/10.3390/batteries8050046, published May 18, 2022.
Shen, Xiaohui, et al., "Research progress on silicon/carbon composite anode materials for lithium-ion battery", Journal of Energy Chemistry 27 (2018) 1067-1090.
Situmeang, Rudy Tahan Mangapul, "Preparation of Hollow Nanostructures via Various Methods andTheir Applications", From the Edited Volume Novel Nanomaterials, Edited by Karthikeyan Krishnamoorthy, published: Jan. 4, 2021.
Suthabanditpong, W., et al., "Improved optical properties of silica/UV-cured polymer composite films made of hollow silica nanoparticles with a hierarchical structure for light diffuser film applications", Phys. Chem. Chem. Phhys., 2016, 18, 16293.
Tan, Darren H.S., et al., "Carbon-free high-loading silicon anodes enabled by sulfide solid electrolytes", Science 373, 1494-1499 (2021) Sep. 24, 2021.
Tong, Ling, et al., "Interface Engineering of Silicon/Carbon Thin-Film Anodes for High-Rate Lithium-Ion Batteries", ACS Apps. Mater. Interfaces 2020, 12, 29242-29252.
Tseng, Yu-Hsien, et al., "On-site coagulation gel polymer electrolytes with a high dielectric constant for lithium-ion batteries", Journal of Power Sources 480 (2020) 228802.
Tveit, Halvard, et al., "Production of High Silicon Alloys", Research Gate Article, Jan. 1998.
Wang, Dingsheng, et al., "High performance amorphous-Si@SiOx/C composite anode materials for Li-ion batteries derived from ball-milling and in situ carbonization", Journal of Power Sources 256 (2014) 190-199.
Wang, Wei, et al., "Monodisperse Porou Silicon Spheres as Anode Materials for Lithium Ion Batteries", Scientific Reports, 5: 8781 6 pages, published Mar. 5, 2015.
Wang, Fei, et al., "One-pot solution synthesis of carbon-coated silicon nanoparticles as an anode material for lithium-ion batteries", Chem. Commun., 2020, 56, 1109-1112.
Yan, Zheng, "Silicon Li-ion Anode Materials via Spray Drying and Magnesiothermic Reduction", published on Jun. 2019, Chemical and Environmental Engineering, pp. 1-106).
Yazdi, Sadegh, et al., "Tuning the Resonance Frequency of Surface Plasmons Localized in Au—Ag Bimetallic Hollow Nanorods In-situ in a Transmission Electron Microscope", Technical Report, Microscopy and Microanalysis, Jul. 2016.
Zhang, Tianwen, "Porous silicon nano-aggregate from silica fume as an anode for high energy lithium-ion batteries", RSC Adv. 2016, 6, 30577-30581.

* cited by examiner

No densification

50% densification

30% densification

SILICON BATTERY AND METHOD FOR ASSEMBLY

CROSS-REFERENCE TO RELATED APPLICATIONS

This application is a divisional of U.S. patent application Ser. No. 17/964,698 filed 12 Oct. 2022, which claims the benefit of U.S. Provisional Application No. 63/254,868 filed 12 Oct. 2021 and U.S. Provisional Application No. 63/273,043 filed 28 Oct. 2021, each of which is incorporated in its entirety by this reference.

TECHNICAL FIELD

This invention relates generally to the battery field, and more specifically to a new and useful system and method in the battery field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
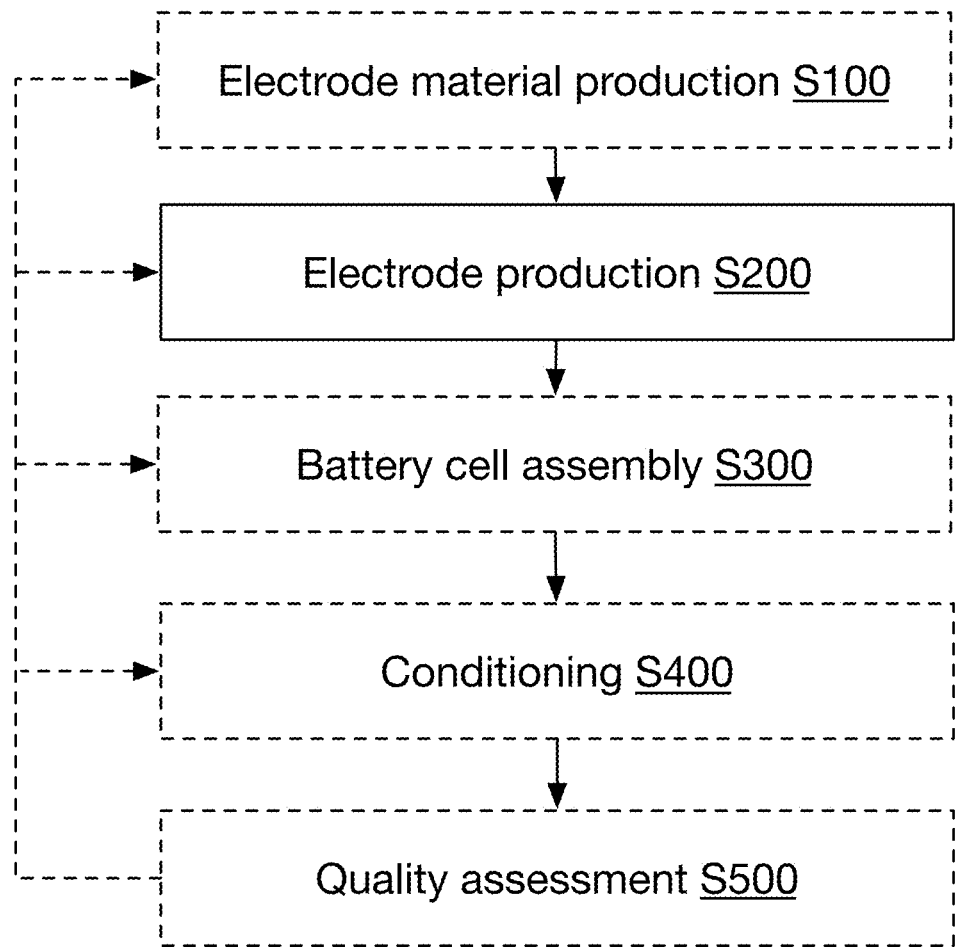
FIG. 1 is a schematic representation of the method.

As shown for example in FIG. 1, a method for manufacturing a battery can include: receiving an electrode material S100; forming an electrode S200; assembling a battery cell S300; optionally, conditioning the battery cell S400; optionally, assessing a quality of the battery S500 (e.g., battery cell, battery pack, etc.); and/or any suitable steps. The battery cell preferably includes an anode, a cathode, a separator, a housing, and an electrolyte; but can additionally or alternatively include any suitable components.

2. Benefits

Variations of the technology can confer several benefits and/or advantages.

First, variants of the technology can enable drop-in functionality for preparing battery including silicon in the anode. For example, a silicon anode material can be used in place of, combined with, and/or in addition to a carbon anode material in the battery manufacture, by including the silicon in a common slurry with the graphite (e.g., without additional processing steps).

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

3. Battery

The battery system 100 preferably functions to generate or produce electrical power and/or provide or supply the electrical power to one or more loads (e.g., which can function to consume the electrical power such as to convert it into another form of energy). The battery system is preferably a secondary cell (e.g., a rechargeable battery system such as one where each electrode can operate as an anode 120 or cathode 110), but can additionally or alternatively form primary cells, bipolar cells, and/or any suitable battery cell. The battery system is preferably operated (e.g., cycled) between about 2.5V and 5V (and/or a range contained therein such as 2.5-4.2V, 2.7V-4.2V, 2.5-4V, 2.7-3.8V, 2.7-4.3V, etc.), but can be cycled between any suitable voltages (e.g., less than 2.5V or greater than 5V). In some variants, limiting the range of operation voltages can improve the stability and/or longevity (e.g., number of cycles before significant degradation occurs, number of cycles before critical battery failure, etc.) of the battery system. The voltage range that the battery system can be operated over can depend on the electrode materials, the electrode capacities, the electrode thicknesses, the load, a programmed (or otherwise specified) voltage range, and/or any suitable properties.

The components of the system can be solid-state, fluid-state (e.g., liquid, plasma, gas, etc.), gel-state, a combination of states (e.g., at a critical point, a mixed state, one component in a first state and another component in a second state, etc.), and/or have any suitable state of matter. The resultant battery can have a solid state build, Li metal build (e.g., lithium-ion or lithium polymer batteries), metal-air build (e.g., silicon-air battery), and/or any other suitable construction. The resultant battery can be rigid, flexible, and/or have any other suitable stiffness (e.g., wherein component thicknesses, numerosity, flexibility, rigidity, state of matter, elasticity, etc. can be selected to achieve the desired stiffness). The resultant battery can be a pouch cell, a cylindrical cell, a prismatic cell, and/or have any other suitable form factor.

The electrodes preferably function to generate ions (e.g., electrons) and to make contact to other parts of a circuit (e.g., a load). The battery system preferably includes at least two electrodes (e.g., an anode and a cathode), but can include any number of electrodes. The number of cathodes and anodes can be equal, there can be more anodes than cathodes, or there can be more cathodes than anodes. For example, the battery can include 1, 2, 3, 4, 5, 6, 10, 20, 50, 100, values or ranges therebetween, and/or any other suitable number of anodes and/or cathodes. The anodes and/or cathodes can be single-sided, double sided, and/or otherwise configured. When the battery includes multiple anodes and/or cathodes, the anodes and cathodes are preferably interleaved (e.g., alternate in the electrode stack); alternatively, the cathodes and/or anodes can be grouped or stacked together and/or can otherwise be arranged (e.g., a single cathode can be surrounded by a plurality of anodes dictated by a cell geometry). Each anode of the plurality of anodes can be the same (e.g., same materials, same physical properties within specification tolerances, same electrical properties, etc.) or different (e.g., different materials, different physical properties, different electrical properties, etc.). Each cathode of the plurality of cathodes can be the same (e.g., same materials, same physical properties within specification tolerances, same electrical properties, etc.) or different (e.g., different materials, different physical properties, different electrical properties, etc.).

Each electrode is preferably in contact with a collector (e.g., charge collector, electron collector, hole collector, etc.), which can functions to collect and transport charged particles (e.g., electrons). The collector can be different or the same for each electrode. The collector is preferably electrically conductive, but can be semiconducting and/or have any suitable conductivity. The collector can be a wire, a plate, a foil, a mesh, a foam, an etched material, a coated material, and/or have any morphology. Example collector materials include: aluminium, copper, nickel, titanium, stainless steel, carbonaceous materials (e.g., carbon nanotubes, graphite, graphene, etc.), brass, polymers (e.g., conductive polymers such as PPy, PANT, polythiophene, etc.), combinations thereof, and/or any suitable material. The electrode is typically deposited on the collector. However, additionally or alternatively the collector can be fastened to, adhered to, soldered to, integrated with (e.g., coextensive with a substrate of), and/or can otherwise be interfaced with the electrode.

Each electrode can be a layered material (e.g., alternating stacks of materials such as an active anode that alternates between carbonaceous material and silicon material), a coextensive material (e.g., active material can be a substantially homogeneous mixture of components), thin films (e.g., 1 nm to 100 μm thick and/or any values or subranges therein), thick films (e.g., >100 μm thick), and/or have any suitable morphology.

Each electrode thickness can be any suitable value or range thereof between about 1 μm and 1 cm (such as 1 μm, 2 μm, 5 μm, 10 μm, 20 μm, 50 μm, 100 μm, 200 μm, 500 μm, 1 mm, 2 mm, 5 mm, 1 cm), a thickness less than 1 μm, and/or a thickness greater than 1 cm. The thickness of each layer can be the same and/or different. For example, an anode can have a thickness approximately equal to 0.1×, 0.2×, 0.5×, 0.8×, 0.9×, 1×, 1.05×, 1.1×, 1.2×, 1.5×, 2×, 2.1×, 2.2×, 2.5×, 3×, 5×, 10×, or values therebetween of the cathode thickness. In a variation on this example, these ratios can relate the capacity of the anode to the cathode (e.g., an anode thickness can be determined to have a thickness that will match an anode capacity to a ratio of the cathode capacity such as in units of mAh/cm²). Having a thicker anode (e.g., thicker than necessary to match a cathode capacity) can be beneficial, for example, because as the cathode transfers material to the anode (e.g., during discharging), the anode may not expand by as much as when the anode and cathode have matching capacities. This benefit can be enabled, for instance, by using an anode material with a large capacity (such as silicon). However, a thicker anode can otherwise be beneficial and/or be enabled.

The N/P ratio (e.g., a capacity ratio such as a linear capacity, an areal capacity, volumetric capacity, total capacity, etc. of the anode to the cathode) is preferably between about 0.5-2 (e.g., 0.5, 0.6, 0.75, 0.9, 1, 1.05, 1.1, 1.15, 1.2, 1.25, 1.3, 1.35, 1.4, 1.45, 1.5, 1.6, 1.7, 1.75, 1.8, 1.9, 2, values or ranged therebetween, etc.), but can be less than 0.5 or greater than 2. A larger N/P ratio can be beneficial for increasing the stability of the anode (e.g., because the anode will be less lithiated and undergo less volume expansion compared to a battery with a smaller N/P ratio). The N/P ratio (e.g., an optimal N/P ratio) can be selected based on the anode material (or properties thereof such as particle or grain size, external expansion coefficient, etc.), cathode material (or properties thereof), battery stability (e.g., a target stability), battery cycles (e.g., a target number of cycles, minimum number of cycles, etc.), energy density, voltage range, electrode thickness, temperature, cell variation, number of layers, electrolyte composition, and/or can otherwise be selected or tuned.

Each electrode can have a single active surface, two active surfaces (e.g., a top and a bottom surface), be active around all or any portion of the exposed surface, and/or have any suitable number of active surfaces, where active surfaces can refer to a surface coupled (e.g., via electrolyte) to another electrode, to an external load (e.g., via a collector), and/or otherwise be defined.

Each electrode preferably has approximately the same capacity (e.g., within ±1%, ±2%, ±5%, ±10%, ±20%, etc.). However, electrodes can have different capacities. For example, an anode can have a capacity approximately equal to 0.1×, 0.2×, 0.5×, 0.8×, 0.9×, 1×, 1.05×, 1.1×, 1.2×, 1.5×, 2×, 2.1×, 2.2×, 2.5×, 3×, 5×, 10×, and/or values therebetween of the cathode capacity (for example, in units of mAh/cm²). However, the anode can have a capacity less than 0.1× or greater than lox the cathode capacity. Having anodes with capacities greater than the cathode can be beneficial for modifying (e.g., improving) a stability of the anode, modifying (e.g., controlling) an expansion of the anode, modifying (e.g., decreasing) an amount of anode plating from the cathode, and/or can otherwise be beneficial. Each electrode capacity can be controlled or modified based on an electrode thickness, an electrode material, an electrode doping, an electrolyte, an electrode doping, an electrode morphology (e.g., porosity, pore volume, pore distribution, etc.), an electrode substrate, and/or any suitable properties.

The electrode substrate (e.g., collector) is preferably a metal (e.g., aluminium, copper, silver, gold, nickel, alloys thereof or incorporating the aforementioned elements, etc.), but can additionally or alternatively include carbonaceous substrates and/or any suitable substrate(s). The substrate thickness is preferably between about 5-20 μm. However, the substrate thickness can be greater than 20 μm or less than 5 μm. In an illustrative example, an anode substrate can be a 9-16 μm thick copper foil. In a second illustrative example, a cathode substrate can be a 9-20 μm thick aluminium foil. However, any substrate can be used.

3.1 Cathode

The cathode material preferably includes lithium, but can additionally or alternatively include any suitable cathode materials. Examples of lithium containing cathode materials include: lithium cobalt oxide (LCO), lithium nickel manganese cobalt oxide (NMC), lithium nickel manganese oxide (LNMO), lithium iron phosphate (LFP), lithium manganese oxide (LMO), lithium nickel cobalt aluminium oxide (NCA), and/or any suitable cathode materials. However, any suitable lithium cathode and/or other cathode material can be used.

3.2 Anode

The anode material can include: active material, binder, conductive material, and/or any suitable material(s).

Active material of the anode preferably includes silicon material, but can additionally or alternatively include carbonaceous material and/or any suitable anode material. The active material is preferably a substantially homogeneous mixture of components, but can be a heterogeneous mixture of components.

The silicon material 124 preferably includes silicon particles 125 (e.g., porous particles, solid particles, nanoparticles, meso particle, microparticles, macroparticles, etc.), but can include films and/or any suitable structure. In variants, the particles can form clusters (e.g., aggregates), agglomers (e.g., agglomerates, clusters of clusters, etc.), and/or can have any suitable form.

The particles are preferably made of silicon, but can additionally or alternatively include silica (e.g., silicon oxide such as $SiO_x$, $SiO_2$, etc.), and/or any suitable additives or other materials or elements. The silicon content of the silicon material is preferably at least 50% (e.g., 50%, 55%, 60%, 65%, 70%, 75%, 80%, 85%, 90%, 91%, 92%, 93%, 94%, 95%, 96%, 97%, 98%, 99%, 99.5%, 99.9%, 99.99%, values therebetween, >99.99% such as by weight, by volume, by stoichiometric ratio, etc.), but can be less than 50% (e.g., can include regions with less than 50% silicon such as carbon rich regions). The remainder of the silicon content can include oxygen, nitrogen, hydrogen, carbon, magnesium, aluminium, lithium, sodium, halogens, and/or any suitable elements. For example, the elemental composition of the silicon material can include SiOC, SiC, $Si_xO_xC$, $Si_xO_xC_x$, $Si_xC_x$, $SiO_x$, $Si_xO_x$, $SiO_2C$, $SiO_2C_x$, $SiOC_y$, $SiC_y$, $Si_xO_xC_y$, $Si_xO_xC_xY_x$, $Si_xC_xY_x$, $SiO_xY_x$, $Si_xO_xY_x$, $SiO_2CY$, $SiO_2C_xY_x$, and/or have any suitable composition (e.g., include additional element(s)), where Y can refer to any suitable element of the periodic table (e.g., halgoens, chalcogens, pnictogens, group 13 elements, transition metals, alkaline earth metals, alkali metals, etc.) and x is preferably between 0.001 and 0.05 (but can be less than 0.001 or greater than 0.05). The material composition of the silicon material can be isotropic (e.g., homogeneous distribution of silicon and other additives, dopants, impurities, etc.) and/or anisotropic (e.g., inhomogeneously distributed silicon and other materials such as forming a core-shell like structure). In an illustrative example of an anisotropic material distribution, a surface of the silicon material (e.g., a surface exposed to atmosphere or an environment proximal the silicon material) can have a higher oxygen or silica concentration than an interior of the silicon material (e.g., a volume that is not proximal or exposed to the atmosphere or environment). However, an engineered material gradient and/or any suitable material distribution can exist within the silicon material.

In some variants, the silicon material can include carbon. For example, the silicon material can be coated with carbon; form a composite, alloy, compound (e.g., silicon carbide), material, and/or other chemical species with carbon; and/or can otherwise include carbon. The carbon can be homogeneous distributed or inhomogeneously distributed (e.g., forming one or more carbon rich and/or carbon poor grains, forming carbon clusters, etc.). In these variants, the total carbon content (e.g., by weight, by volume, by stoichiometric ratio, etc.) can be between 1-99% (e.g., where the remainder can include silicon and/or any suitable trace elements) by weight, by volume, by stoichiometry, and/or according to any suitable reference. However, the carbon content can be less than 1% or greater than 99%. In a first specific example, a silicon material can include at least 50% silicon, and between 1-45% carbon, where the percentages can refer to a mass percentage of each component. In this specific example, the silicon material can include at most about 5% oxygen. In a second specific example, a silicon material can include approximately 85-93% silicon, approximately 2-10% carbon, and approximately 5-10% oxygen, where the percentages can refer to a mass percentage of each component. However, the silicon particles can include any suitable carbon composition.

Figures 7A, 7B, 7C:
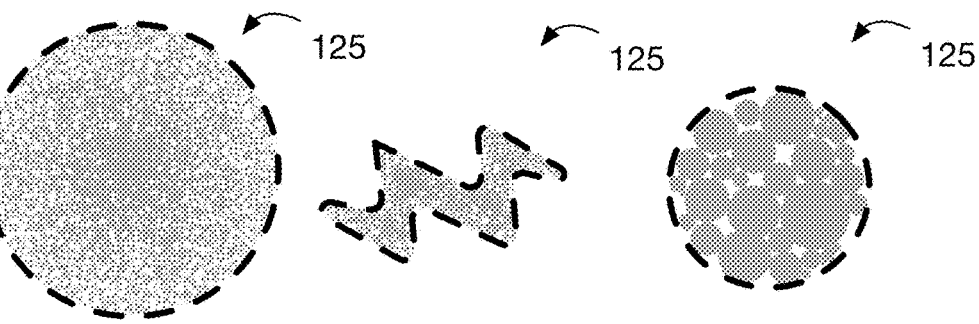
FIGS. 7A-7F are schematic representations of exemplary silicon particles.
Figures 7D, 7E, 7F:
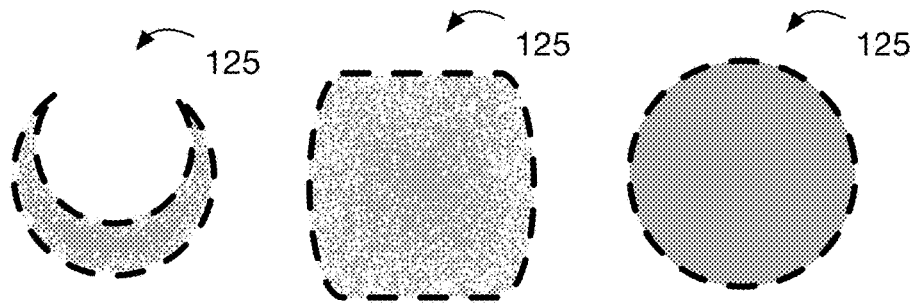
Figure 8A:
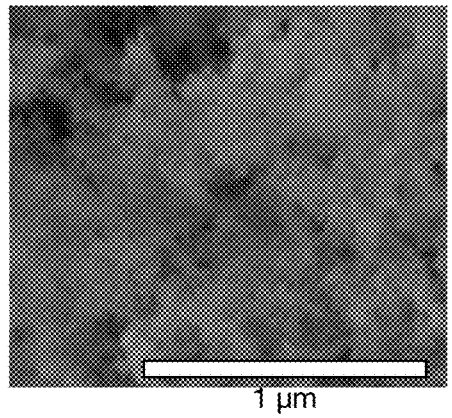
FIGS. 8A-8E are scanning electron micrographs of exemplary silicon particles.
Figure 8B:
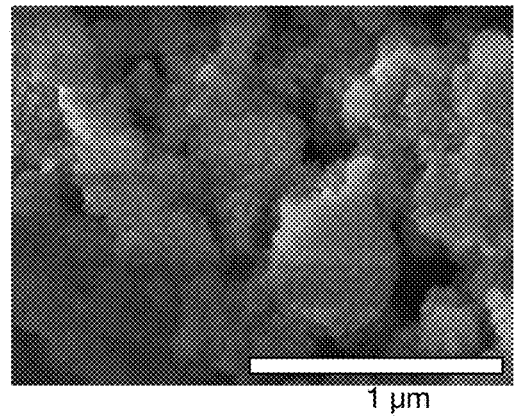
Figure 8C:
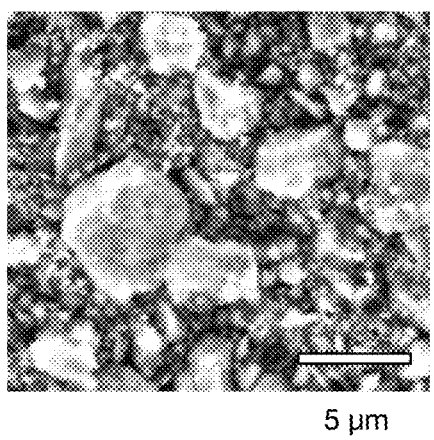
Figure 8D:
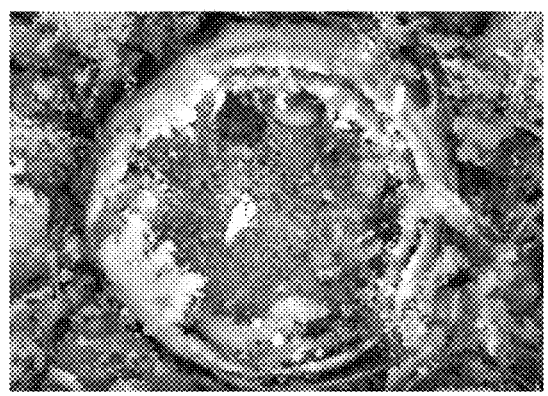
Figure 8E:
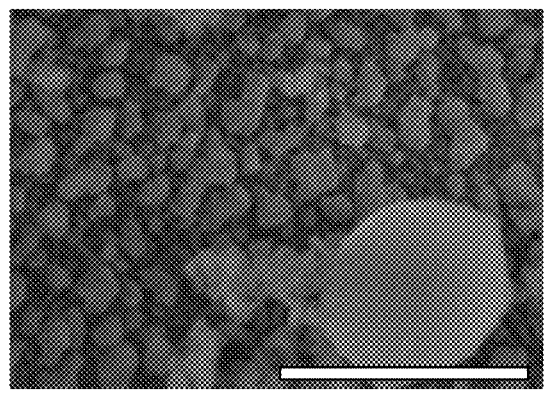

The shape of the particles can be spheroidal (e.g., spherical, ellipsoidal, as shown for example in FIG. 7A, FIG. 7C, FIG. 7F, FIG. 8E, etc.); rod; platelet; star; pillar; bar; chain; flower; reef; whisker; fiber; box; polyhedral (e.g., cube, rectangular prism, triangular prism, frustopyramidal, as shown for example in FIG. 7E or FIG. 8C, etc.); frustoconical, have a worm-like morphology (e.g., vermiform; as shown for example in FIG. 7B, FIG. 8A, or FIG. 8B; etc.); have a foam like morphology; have an egg-shell morphology; have a shard-like morphology (e.g., as shown for example in FIG. 7D or FIG. 8D); include one or more straight edges (e.g., meeting at rounded corners, at sharp corners, etc. as shown for example in FIG. 1E, FIG. 5A, FIG. 5B, FIG. 5C, FIG. 9A, etc.) and/or have any suitable morphology.

Figure 10A:
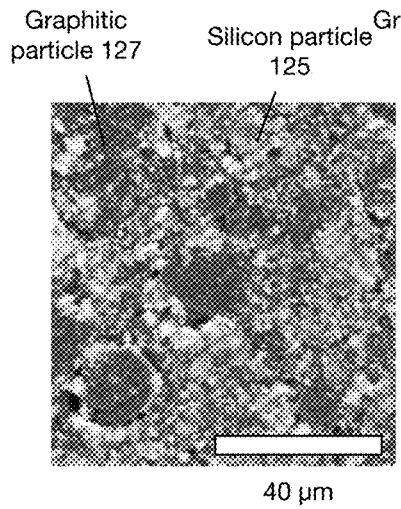
FIGS. 10A-10C are scanning electron micrographs of exemplary silicon anode films with non-milled silicon particles, milled (e.g., cold welded) silicon particles without milling the graphite particles, and milled (e.g., cold welded) silicon particles milled graphite particles respectively.
Figure 10B:
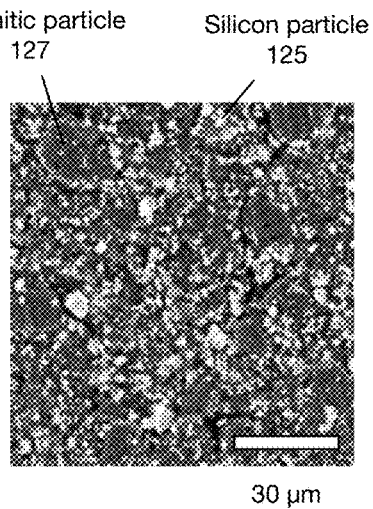

The particles can be freestanding, clustered, aggregated, agglomerated, interconnected, and/or have any suitable relation or connection(s). As an illustrative example (as shown for instance in FIG. 8C or FIG. 10B), a silicon material can include a plurality of fused particles (e.g., clusters, agglomers, agglomerates, etc.), where each fused particle includes a plurality of individual particles that have fused (e.g., been cold welded) together (e.g., without substantially changing a morphology of the underlying particles, by melding the underlying particles at points of intersection, by fusing or sealing a surface of the fused particle and retaining a surface area of the unfused particles, etc.; with a change in the morphology of the individual particles; etc.).

A characteristic size of the particles is preferably between about 1 nm to about 10000 nm such as 2 nm, 5 nm, 10 nm, 20 nm, 25 nm, 3o nm, 5o nm, 75 nm, 100 nm, 125 nm, 150 nm, 175 nm, 200 nm, 250 nm, 300 nm, 400 nm, 500 nm, 1000 nm, 1500 nm, 2000 nm, 2500 nm, 3000 nm, 4000 nm, 5000 nm, 6000 nm, 7500 nm, 8000 nm, 9000 nm, 9500 nm, 10000 nm, values or ranges therebetween, etc.). However, the characteristic size can additionally or alternatively be less than about 1 nm and/or greater than about 10000 nm. For example, a fused particle and/or cluster (e.g., aggregate) of silicon particles can have a characteristic size between about 1 μm and 10 μm (e.g., 1-3 μm, 3-5 μm, 5-10 μm, 3-10 μm, 3-7 μm, 1-5 μm, 1-7 μm, 0.9-3 μm, 8-12 μm, other values or ranges therein, etc.), and the particles that make up the fused particle and/or cluster can have a characteristic size between about 2 and 500 nm (e.g., 1-10 nm, 10-50 nm, 10-100 nm, 20-200 nm, 50-500 nm, 50-525 nm, 10-550 nm, 100-500 nm, values or ranges therein, etc.). In variations of this example, the fused particle and/or clusters can form tertiary structures (e.g., agglomerates, agglomers, etc.) which can have a characteristic size between about 5-100 μm.

The characteristic size can include the radius, diameter, circumference, longest dimension, shortest dimension, length, width, height, pore size, a shell thickness, and/or any size or dimension of the particle. The characteristic size of the particles is preferably distributed on a size distribution (e.g., where the characteristic size can uniquely define the distribution; can be a moment of the distribution; can be associated with specific percentiles of the distribution such as the D10, D20, D50, D60, D80, D90, etc. size; etc.). The size distribution can be a substantially uniform distribution (e.g., a box distribution, a mollified uniform distribution, etc. such that the number of particles or the number density of particles with a given characteristic size is approximately constant), a Weibull distribution, a normal distribution, a log-normal distribution, a Lorentzian distribution, a Voigt distribution, a log-hyperbolic distribution, a triangular distribution, a log-Laplace distribution, and/or any suitable distribution. The characteristic size distribution of the particles (particularly, but not exclusively for fused particles) is preferably narrow (e.g., standard deviation is less than about 20% of a mean of the size distribution), but can be broad (e.g., a standard deviation greater than about 20% of a mean of the size distribution), and/or can otherwise be characterized. A narrow characteristic size distribution can provide a technical advantage of enhancing a lifetime and/or stability of the silicon material as some undesirable processes depend on a size of the silicon material (and having more uniform size such as with a narrow distribution can lead to more uniform degradation within the sample).

The characteristic size (and its associated distributions) are typically determined directly (e.g., by directly imaging the silicon material such as using scanning electron microscopy, transmission electron microscopy, scanning transmission microscopy, etc.), but can be determined indirectly (e.g., based on scattering experiments such as dynamic light scattering; based on optical properties such as bandgap energy, bandgap width, etc.; based on x-ray scattering such as based on a width of x-ray scattering; etc.), and/or can otherwise be determined.

The particles can be solid, hollow, porous, as shown for example in FIGS. 7A-7F or FIGS. 8A-8E, and/or have any structure.

The silicon material can be crystalline, amorphous, nanocrystalline, protocrystalline, and/or have any suitable crystallinity. When the silicon material (e.g., particles thereof) include crystalline regions, the silicon material is preferably polycrystalline, which can provide a technical advantage of accommodating mechanical or other stresses that the silicon material undergo. However, the silicon material can be monocrystalline. In some examples, the silicon particles can include crystalline regions and non-crystalline regions (e.g., amorphous regions).

The exterior surface of the silicon material is preferably substantially sealed (e.g., hinders or prevents an external environment from penetrating the exterior surface). However, the exterior surface can be partially sealed (e.g., allows an external environment to penetrate the surface at a predetermined rate, allows one or more species from the external environment to penetrate the surface, etc.) and/or be open (e.g., porous, include through holes, etc.). The exterior surface can be defined by a thickness or depth of the silicon material. The thickness is preferably between about 1 nm and 10 μm (such as 1 nm, 2 nm, 3 nm, 5 nm, 10 nm, 20 nm, 50 nm, 100 nm, 200 nm, 500 nm, 1 μm, 2 μm, 5 μm, 10 μm, values therebetween), but can be less than 1 nm or greater than 10 μm. The thickness can be homogeneous (e.g., approximately the same around the exterior surface) or inhomogeneous (e.g., differ around the exterior surface).

In specific examples, the exterior surface can be welded, fused, melted (and resolidified), and/or have any morphology. For example, the silicon particles can be cold welded (e.g., as disclosed in U.S. patent application Ser. No. 17/824,627 titled 'SILICON MATERIAL AND METHOD OF MANUFACTURE' filed 25 May 2022, which is incorporated in its entirety by this reference).

The (specific) surface area of the exterior surface of the silicon material is preferably small (e.g., less than about 0.01, 0.5 $m^2/g$, 1 $m^2/g$, 2 $m^2/g$, 3 $m^2/g$, 5 $m^2/g$, 10 $m^2/g$, 15 $m^2/g$, 20 $m^2/g$, 25 $m^2/g$, 30 $m^2/g$, 50 $m^2/g$, values or between a range thereof), but can be large (e.g., greater than 10 $m^2/g$, 15 $m^2/g$, 20 $m^2/g$, 25 $m^2/g$, 30 $m^2/g$, 50 $m^2/g$, 75 $m^2/g$, 100 $m^2/g$, 110 $m^2/g$, 125 $m^2/g$, 150 $m^2/g$, 175 $m^2/g$, 200 $m^2/g$, 300 $m^2/g$, 400 $m^2/g$, 500 $m^2/g$, 750 $m^2/g$, 1000 $m^2/g$, 1250 $m^2/g$, 1400 $m^2/g$, ranges or values therebetween, >1400 $m^2/g$) and/or any suitable value.

The (specific) surface area of the interior of the silicon material (e.g., a surface exposed to an internal environment that is separated from with an external environment by the exterior surface, a surface exposed to an internal environment that is in fluid communication with an external environment across the exterior surface, interior surface, etc.) is preferably large (e.g., greater than 10 $m^2/g$, 15 $m^2/g$, 20 $m^2/g$, 25 $m^2/g$, 30 $m^2/g$, 50 $m^2/g$, 75 $m^2/g$, 100 $m^2/g$, 110 $m^2/g$, 125 $m^2/g$, 150 $m^2/g$, 175 $m^2/g$, 200 $m^2/g$, 300 $m^2/g$, 400 $m^2/g$, 500 $m^2/g$, 750 $m^2/g$, 1000 $m^2/g$, 1250 $m^2/g$, 1400 $m^2/g$, ranges or values or between a range thereof). In some variations, the internal surface area can be less than a threshold surface area (e.g., 200 $m^2/g$, 300 $m^2/g$, 500 $m^2/g$, 750 $m^2/g$, 1000 $m^2/g$, 1500 $m^2/g$, 2000 $m^2/g$, 5000 $m^2/g$, etc.), which can provide a technical advantage of limiting oxidation of the silicon material prior to the formation of an external surface (e.g., with a lower surface area, sealed external surface, etc.). However, there need not be a threshold upper surface area (e.g., by controlling an environment to have less than a target oxygen concentration that can depend on the surface). However, the surface area of the interior can be above or below the values above, and/or be any suitable value.

In some variants, the surface area can refer to a Brunner-Emmett-Teller (BET) surface area. However, any definition, theory, and/or measurement of surface area can be used. The surface area can be determined, for example, based on calculation (e.g., based on particle shape, characteristic size, characteristic size distribution, etc. such as determined from particle imaging), adsorption (e.g., BET isotherm), gas permeability, mercury intrusion porosimetry, and/or using any suitable technique. In some variations, the surface area (e.g., an internal surface area) can be determined by etching the exterior surface of the material (e.g., chemical etching such as using nitric acid, hydrofluoric acid, potassium hydroxide, ethylenediamine pyrocatechol, tetramethylammonium hydroxide, etc.; plasma etching such as using carbon tetrafluoride, sulfur hexafluoride, nitrogen trifluoride, chlorine, dichlorodifluoromethane, etc. plasma; focused ion beam (FIB); etc.), by measuring the surface area of the material before fusing or forming an external surface, and/or can otherwise be determined. However, the surface area (and/or porosity) can be determined in any manner.

In some variations, the silicon material (e.g., silicon particles) can include a coating. The coating is preferably a carbonaceous coating (e.g., an inorganic carbon coating, polymer coating, etc.). However, any suitable coating can be used. The coating material can be the same as and/or different from the binder and/or conductive additive materials (e.g., where coating material is accounted for as a portion of the active materials in the anode). However, any suitable coating material can be used. As an illustrative example, silicon particles can be coated with polyacrylonitrile (e.g., PAN). A coating thickness is preferably 1-10 nm. However, the coating thickness can be less than 1 and/or greater than 10 nm, In specific example, a silicon material can include a coating as disclosed in (e.g., a coated silicon material can be as disclosed in) U.S. patent application Ser. No. 17/890,863 titled 'SILICON MATERIAL AND METHOD OF MANUFACTURE' filed 18 Aug. 2022, which is incorporated in its entirety by this reference.

The silicon material preferably has a small external expansion (e.g., less than about 30% external expansion, less than 15%, 0% external expansion, compression, etc.), where the external expansion can be a volumetric, areal, linear, and/or other expansion (e.g., in response to temperature changes, in response to swelling due to chemicals, in response to lithiation, etc.). However, the silicon material can have any suitable external expansion.

In some variations, the silicon material can be a material as disclosed in U.S. patent application Ser. No. 17/525,769 titled 'SILICON MATERIAL AND METHOD OF MANUFACTURE' and filed 12 Nov. 2021, PCT Publication Number WO2022104143 titled 'METHOD OF MANUFACTURE OF POROUS SILICON' and filed 12 Nov. 2021, U.S. patent application Ser. No. 17/841,435 titled 'SILICON MATERIAL AND METHOD OF MANUFACTURE' and filed 15 Jun. 2022, U.S. application Ser. No. 17/824,627 titled 'SILICON MATERIAL AND METHOD OF MANUFACTURE' filed 25 May 2022, U.S. application Ser. No. 17/890,863 titled 'SILICON MATERIAL AND METHOD OF MANUFACTURE' filed on 18 Aug. 2022, each of which is incorporated in its entirety by this reference. However, any suitable material can be used.

Carbonaceous material of the active material preferably contributes to the capacity of the active material. However, the carbonaceous material be a noncontributor to the capacity. The carbonaceous material is preferably graphitic material (e.g., graphite, graphene, carbon nanotubes, carbon nanoribbons, carbon quantum dots, etc.). However, additionally or alternatively, any suitable carbonaceous material can be included.

Figure 10C:
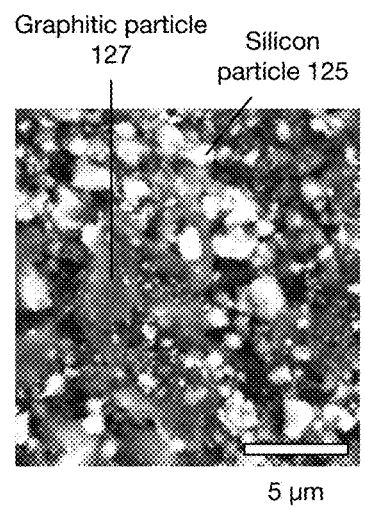

The graphitic material 126 preferably includes graphite particles 127. However, additionally or alternatively, graphite films, graphite sheets, shards, and/or can have any suitable morphology. The graphite particles are preferably spheroidal (e.g., with a sphericity greater than about 0.95). However, the graphite particles can additionally or alternatively be ellipsoidal, fiber-shaped, irregular-shape, polyhedral, and/or can have any suitable shape. A characteristic size (e.g., diameter, radius, circumference, largest aspect, shortest aspect, etc. where the characteristic size can refer to a mean size, D10, D90, D25, D75, etc. of a particle size distribution) of the graphite particles is preferably between about 10 µm and 50 µm. However, the characteristic size can be less than 10 µm and/or greater than 50 µm. In some variants, the graphitic particles can be broken into shard like morphologies (e.g., by milling, comminution, etc.) as shown for example in FIG. 10B or FIG. 10C.

Figure 11:
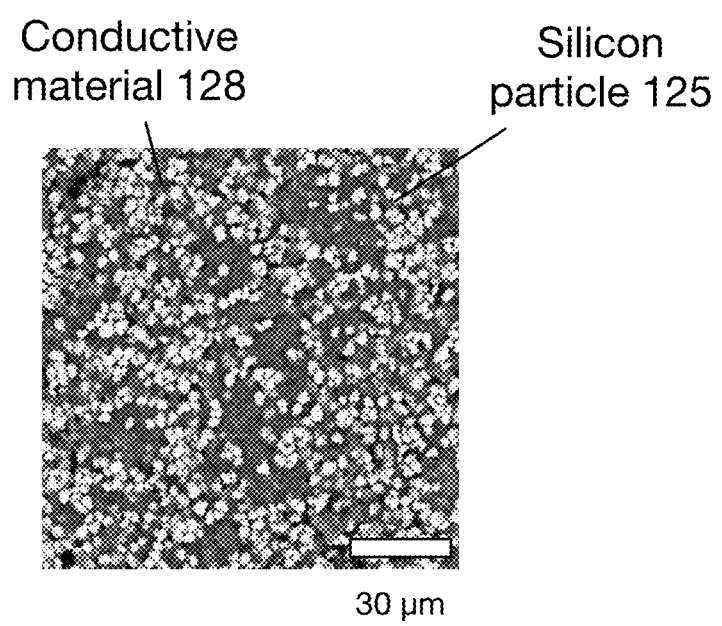
FIG. 11 is a scanning electron micrograph of an exemplary silicon anode film that includes silicon particles and C65 carbon black (e.g., the silicon anode does not include graphite).

In a first specific example, the active material can include about 30-50% silicon particles and/or silicon materials (e.g., by mass, by volume, by stoichiometry, by particle count, etc.) and about 50-70% graphitic material (e.g., by mass, by volume, by stoichiometry, by particle count, etc.). In a second specific example (as shown for instance in FIG. 11), the active material can be composed essentially of (e.g., 99%, 99.9%, 99.95%, 99.99%, etc.) silicon particles. However, the active material can include any suitable amount of silicon particles (and/or silicon materials such as 10-90% by mass, volume, stoichiometry, particle count, etc.), graphitic material (e.g., graphite particles; such as 10-90% by mass, volume, stoichiometry, particle count, etc.), and/or any suitable components.

The binder 129 can functions to secure (e.g., adhere) the electrode to the substrate and/or a housing (e.g., case) of the battery system, secure (e.g., bond, adhere, laminate, etc. such as to maintain electrical contact between, a threshold spacing between, etc.) active material together (e.g., adhere silicon particles to other silicon particles, adhere silicon particles to graphitic particles, etc.), and/or can otherwise function. The binder can be electrically insulating, electrically conductive, semiconducting, and/or have any suitable electrical conductivity. Examples of binders include: carboxymethyl cellulose (CMC), styrene-butadiene rubber (SBR), poly(acrylic acid) (PAA), sodium alginate (SA), polyvinylidene fluoride (PVDF), polyaniline (PANI), poly (9,9-dioctylfluorene-cofluorenone-co-methyl benzoic ester) (PFM), polytetrafluoroethylene (PTFE), poly(ethylene oxide) (PEO), polyvinyl alcohol (PVA), polyacrylonitrile (PAN), sodium carboxymethyl chitosan (CCTS), poly(3,4-ethylenedioxythiophene) polystyrene sulfonate (PEDOT: PSS), 3,4-propylenedioxythiophene (ProDOT), dopamine hydrochloride, polyrotaxanes, polythiophene, combinations thereof, and/or any suitable binder. In an illustrative example, an approximately 1:1 mixture (by mass, by volume, by stoichiometry, etc.) of SBR to CMC can be used as a binder. In some variations, the binder can be a coating of the silicon particles and/or graphitic particles.

The conductive material 128 can function to modify an electrical conductivity of the electrode (e.g., to ensure that the electrode has at least a threshold electrical conductivity, to ensure that the electrode has at most a threshold electrical conductivity, to ensure that the active material is electrically connected to the collector throughout the electrode, etc.). Examples of conductive materials include: carbon super P, acetylene black, carbon black (e.g., C45, C65, etc.), mesocarbon microbeads (MCMB), graphene, carbon nanotubes (CNTs) (e.g., single walled carbon nanotubes, multiwalled carbon nanotubes, semi-conducting carbon nanotubes, metallic carbon nanotubes, etc.), reduced graphene oxide, graphite, fullerenes, conductive polymers, combinations thereof, and/or any suitable material(s).

In a specific example of an anode composition, the anode can include about 70% (by mass, by volume, by stoichiometry, etc.) active material, about 20% (by mass, by volume, by stoichiometry, etc.) conductive material, and about 10% (by mass, by volume, by stoichiometry, etc.) binder. In a second specific example of an anode composition, the anode can include about 60-95% (by mass, by volume, by stoichiometry, etc.) active material, about 0-20% (by mass, by volume, by stoichiometry, etc.) conductive material, and about 0-20% (by mass, by volume, by stoichiometry, etc.) binder (including any suitable range or combination contained therein). However, the anode can include any suitable material(s) and/or composition.

3.3 Separator

The separator 130 preferably functions to hinder, slow, or prevent an anode and cathode from electrically contacting one another (thereby shorting the battery) while allowing ions (e.g., lithium cations) to pass through the separator. The separator is preferably flexible, but can be rigid and/or have any suitable mechanical property(s). The separator(s) are preferably ionically conductive, but can be ionically insulating, promote (or hinder) ion diffusion, and/or have any suitable ionic conductivity. The separator(s) can be permeable to electrolyte (e.g., be porous), can release electrolyte, can pump electrolyte, be solid, include through holes, be mesh, have unidirectional pathways, and/or can otherwise facilitate a (real, apparent, or effective) transfer of electrolyte from one side of the separator to the other. At least one separator is preferably arranged between each cathode/anode pair. However, the separator(s) can otherwise be arranged. The separator can be equidistant between the cathode and anode, closer to (e.g., proximal) the anode, or closer to (e.g., proximal) the cathode. However, the separator can otherwise be arranged. The separator preferably has a thickness between about 10 μm and 50 μm, but can be thinner than wpm or thicker than 50 μm.

The separator can be made of or include ceramics, gels, polymers, plastics, glass, wood, and/or any suitable materials. In some variants, a separator referred to as a "dry cell separator" can be used. Examples of separator materials include: polyolefin, polypropylene, polyethylene, combinations thereof (e.g., a mixture or blend of PP and PE), and/or any suitable separator material(s). In some variants, the separator can be a multi-layered separator. For instance, a polypropylene/polyethylene/polypropylene separator or a ceramic coated separator (e.g., ceramic coated PP, ceramic coated PE, ceramic coated PP/PE mixture, etc.) can be used. However, any suitable separator can be used.

In some variants, an ionic conductive polymer can be used as the separator and/or as an ionic conductive pathway (e.g., as electrolyte, as conductive material, etc.). The ionic conductive polymer can be mixed in and/or coat the anode and/or cathode and form an ionic conductive network throughout the cell. However, the ionic conductive polymer can otherwise be arranged.

3.4 Electrolyte

The electrolyte 140 preferably functions to electrically connect anode(s) to cathode(s) and enable or promote the movement of ions (but preferably not electrons) between the electrodes. However, the electrolyte can otherwise function. The electrolyte can be solid-phase, fluid phase (e.g., liquid-phase), and/or any suitable phase. For example, the electrolyte can be or include: a gel, a powder, a salt dissolved in a solvent, an acid, a base, a polymer, a ceramic, a salt (e.g., a molten salt), a plasma, ionic liquids, and/or have any suitable state or combination thereof of matter. The electrolyte can include organic materials, inorganic materials, and/or combinations thereof.

Examples of electrolytes (e.g., electrolyte salts), particularly but not exclusively for use with lithium ion batteries, include: lithium lanthanum titanates (e.g., $Li_{0.34}La_{0.51}TiO_{2.94}$, $Li_{0.75}La_{0.5}TiO_3$, $(Li_{0.33}La_{0.56})_{1.005}Ti_{0.99}Al_{0.01}O_3$, etc.), lithium aluminium phosphates (e.g., $Li_{1.3}Al_{0.3}Ti_{1.7}(PO_4)_3$, $Li_{1.5}Al_{0.5}Ge_{1.5}(PO_4)_3$, etc.), lithium zirconates (e.g., $Li_7La_3Zr_2O_{12}$, $Li_{6.55}La_3Zr_2Ga_{0.15}O_{12}$, $Li_{6.4}La_3Zr_2Al_{0.2}O_{12}$, etc.), lithium silicon phosphates (e.g., $Li_{3.25}Si_{0.25}P_{0.75}O_4$), lithium germanates (e.g., $Li_{2.8}Zn_{0.6}GeO_4$, $Li_{3.6}Ge_{0.8}S_{0.2}O_4$, etc.), lithium phosphorous oxynitrides (e.g., $Li_{2.9}PO_{3.3}N_{0.46}$), lithium phosphorous sulfides (e.g., $Li_7P_3S_{11}$, $Li_{10}GeP_2S_{12}$, $Li_{3.25}Ge_{0.25}P_{0.75}S_4$, $Li_{3.4}Si_{0.4}P_{0.6}S_4$, $Li_3PS_4$, etc.), lithium silicon phosphates (e.g., $Li_{3.5}Si_{0.5}P_{0.5}O_4$), lithium argyrodites (e.g., $Li_6PS_5Br$, $LiPS_5Cl$, $Li_7PS_6$, $Li_6PS_5I$, $Li_6PO_5Cl$, etc.), lithium nitrides (e.g., $Li_3N$, $Li_7PN_4$, $LiSi_2N_3$, etc.), lithium imide (e.g., $Li_2NH$), lithium borohydride (e.g., $LiBH_4$), lithium aluminium hydride (e.g., $LiAlH_4$), lithium amides (e.g., $LiNH_2$, $Li_3(NH_2)_2I$, etc.), lithium cadmium chloride (e.g., $Li_2CdCl_4$), lithium magnesium chloride (e.g., $Li_2MgCl_4$), lithium zinc iodide (e.g., $Li_2ZnI_4$), lithium cadmium iodide (e.g., $Li_2CdI_4$), lithium chlorate (e.g., $LiClO_4$), lithium bis(trifluoromethanesulfonyl)imide (e.g., $LiC_2F_6NO_4S_2$), lithium hexafluoroarsenate (e.g., $LiAsF_6$), lithium hexafluorophosphate (e.g., $LiPF_6$), combinations thereof, and/or any suitable electrolytes (e.g., electrolyte salts, for instance replacing lithium with the appropriate ion associated with a cathode of the battery).

Examples of matrices (e.g., gels, hydrogels, polymers, solvents, etc.) can include: poly(ethylene oxide) (PEO), poly(vinylidene fluoride) (PVDF), polyacrylonitrile (PAN), poly(methyl methacrylate) (PMMA), ethylene carbonate (EC), diethyl carbonate (DEC), dimethyl carbonate (DMC), propylene carbonate (PC), polyethylene glycol (PEG), glycerol, water, combinations thereof, and/or any suitable matrix can be used. Typically, an electrolyte salt is dissolved in the matrix to a concentration between about 0.1 M and 10 M, but the concentration of the electrolyte salt can be less than 0.1M or greater than 10 M.

In some examples, a mixture of inorganic and organic electrolytes can be used such as: $Li_{6.4}La_3Zr_2Al_{0.2}O_{12}$ in PEO/LiTFSI, $Li_{1.5}Al_{0.5}Ti_{1.5}(PO_4)_3$ in PVDF/LiClO$_4$, or $Li_{0.33}La_{0.557}TiO_3$ in PAN/LiClO$_4$. However, any pure or combination of electrolytes can be used.

In some variants, the electrolyte can include one or more additives, which can function to facilitate (or hinder) the formation of the interfacial layer. Examples of additives include: vinylene carbonate (VC), fluoroethylene carbonate (FEC), propylene carbonate (and its derivatives), ammonium perfluorocaprylate (APC), vinyl ethylene carbonate (VEC), maleimides (e.g., ortho-phenylenedimaleimide, para-phenylenedimaleimide, meta-phenylenedimaleimide, etc.), glycolide, tetraoxaspiro[5,5]undecanes (TOS; such as 3,9-Divinyl-2,4,8,10-tetraoxaspiro[5,5]undecane), polyether modified siloxanes, combinations thereof, and/or other additives.

In some variants, the separator and electrolyte can be the same and/or integrated together. For example, the separator and/or the electrolyte can include a lithium ion conductive glass or ceramic material such as: lithium lanthanum titanate (LLTO; e.g., $Li_{3x}La_{2/3-x}TiO_3$ for $0<x<2/3$ such as x=0.11), lithium lanthanum zirconate (LLZO; e.g., $Li_7La_3Zr_2O_{12}$), lithium lanthanum zirconium tantalate (LLZTO; e.g., $Li_{6.75}La_3Zr_{1.75}Ta_{0.25}O_{12}$), lithium aluminium germanium phosphate (LAGP; e.g., $Li_{1.5}Al_{0.5}Ge_{1.5}P_3O_{12}$), lithium aluminium silicon phosphorous titanium oxide (LASPT; e.g., $Li_2Al_2SiP_2TiO_{13}$), combinations thereof, and/or any suitable materials. However, any suitable lithium-ion conductive glass or ceramic material can be used.

The battery system preferably includes a housing 140 (e.g., container), which functions to enclose the electrodes, electrolyte, separator, and/or collector. The housing can function to prevent shorting of the electrodes resulting from contact with objects in the external environment. The housing can be made of metal (e.g., steel, stainless steel, etc.), ceramics, plastic, wood, glass, and/or any suitable materials. Examples of housing shapes include round (e.g., coin, button, cylindrical, etc.), not round, flat (e.g., layer built, pouch, etc.), prismatic (e.g., square, rectangular, etc.), and/or any suitable shape. The housing is preferably electrically insulated from the electrodes. However, in some variations, the housing can be in electrical contact with one or more electrodes (e.g., or more anode in a battery that includes more than one anode, one or more cathode in a battery that includes more than one cathode, etc.).

The housing preferably includes two terminals (e.g., one positive and one negative), but can include more than two terminals (e.g., two or more positive terminals, two or more negative terminals), a single terminal, and/or any number of terminals. The terminals can function to connect the battery electrodes to a load. Examples of terminals include coiled terminals, spring terminals, plate terminals, and/or any suitable terminals.

The housing can be sealed using adhesive, fastener(s), connector(s), binder(s), physical seal, chemical seals, electromagnetic seals, and/or any suitable connectors or sealing mechanism.

In a specific example, a battery can include any suitable battery as disclosed in U.S. patent application Ser. No. 17/672,532 titled 'SILICON ANODE BATTERY' filed 15 Feb. 2022, which is incorporated in its entirety by this reference.

4. Method

The method can function to manufacture a battery (e.g., a battery as described above). The method can include: producing an electrode material S100, producing an electrode S200, assembling the battery S300, conditioning the battery S400, assessing the battery S500, and/or any suitable steps. The method and/or steps thereof can be performed in a single chamber (e.g., a furnace, an oven, etc.) and/or in a plurality of chambers (e.g., a different chamber for each step or substep, a heating chamber, a coating chamber, a milling chamber, a washing chamber, etc.). The method (and/or steps thereof) can be performed in a roll-to-roll process, in a batch process, and/or in a any suitable process.

Producing an electrode material S100 can function to make (e.g., produce, manufacture, synthesize, etc.) an active material for a cathode and/or anode. S100 can additionally or alternatively include making any suitable battery component (e.g., binder, conductive additive, separator, housing, electrolyte, etc.). In a first specific example, a cathode active material can be produced by forming oxides of lithium and/or any suitable metals (e.g., manganese for LMO; nickel, cobalt, and aluminium for NCA; manganese and nickel for LMNO; iron for LFP; etc.) such as by calcinating raw materials (and/or refining the raw materials to achieve a target metal composition); sintering the oxides; and optionally comminuting the sintered oxides. In a second specific example, an anode active (e.g., silicon particles thereof) material can be produced by reducing a silica precursor by: optionally purifying the silica precursor, exposing the silica to reaction modifiers (e.g., reducing agents such as magnesium, aluminium, etc.; thermal modifiers such as salt; etc.), optionally purifying the silica and reaction modifier mixture, optionally comminuting the silica (e.g., using a ball mill), reducing the silica to silicon (e.g., by heating the silica and reaction modifier to a reducing temperature), optionally purifying the silicon, optionally processing the silicon, and/or any suitable steps or processes. Examples of silica precursors include: waste silica (e.g., silica generated as a byproduct from another process such as waste, residual, etc. silica from a silicon purification process; silica produced during silicon production for solar, semiconductor, etc.; silica that would otherwise be disposed of; etc.), recycled silica (e.g., silica recycled or repurposed after a different use), pristine silica (e.g., newly manufactured silica), and/or any suitable silica starting material. The silica precursor is preferably silica fumes (e.g., fumed silica, fume silica, Cabosil fumed silica, aerosil fumed silica, etc.). However, the silica precursor can additionally or alternatively include sol-gel silica (e.g., silica prepared according to the Stober method), diatoms, glass, quartz, sipernat silica, precipitated silica, silica gels, silica aerogels, decomposed silica gels, silica beads, silica sand, and/or any suitable silica material.

However, an electrode material (e.g., electrode active material) can be manufactured in any manner.

Producing an electrode S200 functions to manufacture (e.g., prepare, make, synthesize, form, etc.) an electrode. Each electrode (e.g., anode, cathode) can be processed and/or formed in the same or a different manner. The electrodes are preferably manufactured by casting a film of electrode material on a current collector. The electrode material is preferably cast from a suspension (e.g., solution, slurry, mixture, colloid, gel, etc.). Each electrode suspension can include: one or more solvent (e.g., water, organic solvent), binder (e.g., functional to bind electrode material together, to bind electrode material to the collector, etc. such as polymers), conductive material (e.g., conductive carbon additives), active material (e.g., anode active material, cathode active material, etc.), and/or any suitable additives or materials with any suitable concentration or relative concentration.

However, the electrode material can be cast from solid state, gas state, plasma state, liquid state, and/or any suitable state or mixture of materials. However, the electrodes can additionally or alternatively be grown, deposited, transferred to, and/or otherwise be formed on the collected. The electrodes can be produced in a roll-to-roll process, batch process, and/or using any suitable process. As an example, the electrodes can be produced using a coating machine (e.g., coater). However, any suitable tool(s) can be used to produce the electrodes.

Figure 2:
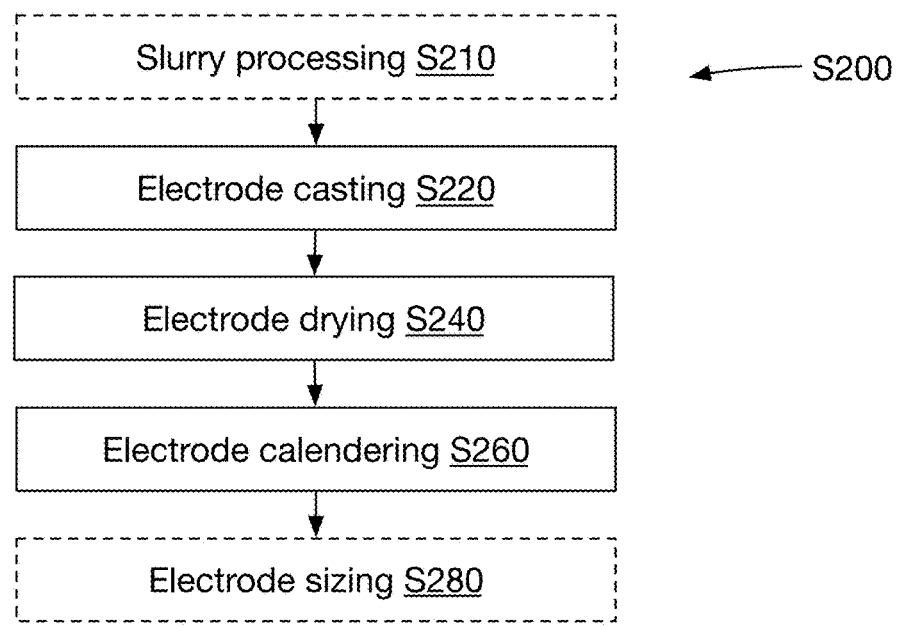
FIG. 2 is a schematic representation of an example of preparing an electrode.

As shown for example in FIG. 2, S200 can include: receiving (e.g., forming) a suspension of electrode material S205 (e.g., from a manufacturer, from individual components, from materials as prepared in S100, etc.); optionally, processing the suspension S210 (e.g., dispersing the suspension, agitating the suspension, mixing the suspension, etc.); casting the electrode S220 (e.g., by depositing the electrode material on an collector); optionally, drying the electrode S240; optionally, compacting the electrode S260 (e.g., densifying, calendering, etc.); optionally, sizing the electrode S280 (e.g., cutting the electrode); and/or any suitable steps.

Processing the suspension S210 can function to improve a homogeneity of the suspension, disperse materials that have settled within the suspension, and/or can otherwise function. The suspension can be processed in a fluidic chamber (e.g., microfluidic channel, microfluidic channel, etc.), vat (e.g., mixing basin), grinder, and/or in any suitable mixing vessel. The suspension can be mixed, for instance, using agitators, turbulators, blowers, fans, blades, paddles, stirrers (e.g., magnetic stirrers), shakers, speakers, grinders (e.g., ball mill), and/or any suitable components.

Components of the suspension can be added simultaneously and/or sequentially. For example, an anode slurry (e.g., slurry for making an anode) can be formed (e.g., processed) by simultaneously mixing anode active material, binder, and/or conductive material in a solvent (e.g., a mixture of water and ethanol). In a second example, an anode slurry can be formed by sequentially mixing anode active material in a solvent (e.g., a mixture of water and ethanol with a composition between 0% water and 100% water by mass, by volume, by stoichiometry, etc.), followed by mixing conductive material, followed by mixing binder. In a variation of the second example, the anode active material can be sequentially mixed for instance by first mixing silicon material in the solvent then graphite material (or vice versa). In a second variation (that can be combined with or separate from the first variation), the binder can be sequentially mixed in the suspension for instance by first mixing CMC in the suspension before mixing SBR in the suspension (or vice versa). However, the slurry can otherwise be formed or manufactured.

Casting the electrode functions to dispose electrode material on a collector. The electrode can be cast on a single side (e.g., broad face) of the collector and/or multiple sides (e.g., broad faces such as on two opposing sides) of the collector. The electrode suspension can be cast using drop-casting (e.g., with a doctor blade to achieve a target thickness), spin coating, slot-die coating, spray coating, brush coating, powder coating, printing, air knife coating, anilox coating, flexo coating, gap coating, gravue coating, dip coating, kiss coating, roller coating, extrusion coating (e.g., curtain coating, slide coating, slot die bead coating, etc.), and/or in any manner.

In some variants, a dry electrode casting process can be used where electrode material is deposited without dispersing the electrode material in a slurry.

The collector is preferably a foil but can have any suitable geometry. The collector is preferably aluminium (e.g., 5-15 μm thick aluminium foil) for the cathode and copper (e.g., 5-10 μm thick copper foil) for the anode, but can be made of any suitable materials. The same or different casting process can be used for each electrode.

Drying the electrode S240 functions to remove excess solvent from the cast electrode. Drying the cast electrode can additionally or alternatively function to partially densify the cast electrode, anneal the cast electrode (e.g., modify or change a phase of electrode materials), cyclize a polymer (e.g., cyclize PAN), crosslink one or more polymers, and/or can otherwise function.

The cast electrode (e.g., wet film, cast film, wet electrode film, wet cathode film, wet anode film, etc.) is preferably dried at a temperature below a carbonization temperature of a polymer (e.g., polymeric constituent of the electrode). For instance, the cast electrode can be dried at a temperature between about 0° C. and 200° C. However, in some variants drying can be performed at a temperature greater than 200° C. (e.g., to partially or fully carbonize polymer) and/or at a temperature less than 0° C.

In some variations, the cast electrode can be dried under vacuum, using dry air (e.g., air, gas, etc. with a relative humidity less than about 40%), and/or can be dried in any manner.

Figure 9A:
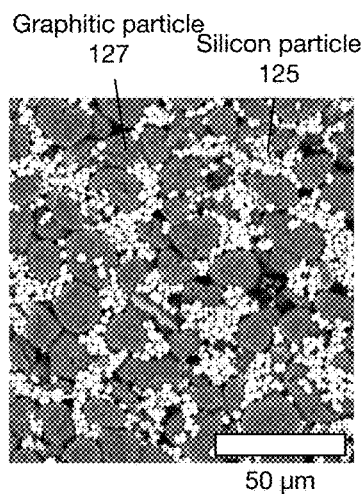
FIGS. 9A-9C are scanning electron micrographs of exemplary silicon anode films with no calendering, 50% calendering (e.g., densification, compaction, etc.), and 30% calendering (e.g., densification, compaction, etc.) respectively.
Figure 9B:
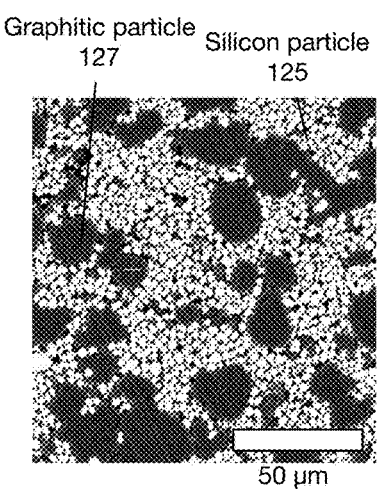
Figure 9C:
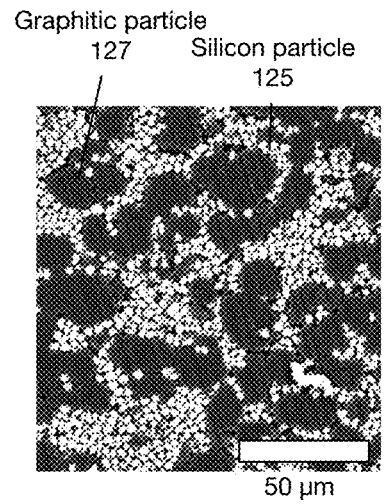

Densifying the electrode S360 preferably functions to increase a density of the electrode film (e.g., cast electrode, dried electrode, dried electrode film, dry electrode, etc.), which can improve the battery's energy density, charge/discharge rates, wettability, cycle life, stability, durability, and/or other properties of the battery. Densifying the electrode can additionally or alternatively enhance a contact (e.g., electrical contact) between components of the electrode and/or can otherwise function (as shown for example by comparing the SEM images in FIG. 9A, FIG. 9B, and FIG. 9C).

Densifying the electrode can include compacting the electrode (e.g., using a compactor), calendering the electrode (e.g., using a calender), pressing the electrode (e.g., using a pressing mill), and/or otherwise densifying the electrode. The electrode is typical densified (e.g., a density of the electrode is increased by) between about 10% and 75% (e.g., 10%, 15%, 20%, 25%, 30%, 33%, 40%, 50%, 55%, 60%, 66%, 70%, 75%, values or ranges therebetween, etc.). For instance, an electrode can have a density of about 1 g/cm$^3$ before densification and a density of about 1.3 to 1.5 g/cm$^3$ after densification. Typically, too much densification will result in a silicon material that undergoes greater than a threshold and/or target external expansion (e.g., during lithiation which can result in degradation of a silicon anode resulting from delamination, particle degradation, repeated SEI layer formation and cracking, etc.). However, the electrode can be densified by greater than 75% (e.g., for applications where higher densities are acceptable) and/or less than 10%.

The electrode(s) can be densified at room temperature (e.g., about 20° C., 25° C., 30° C., etc.), at a temperature less than room temperature (e.g., about 0° C., about 10° C., <0° C., etc.), and/or at a temperature greater than room temperature (e.g., 40° C., 50° C., 75° C., 100° C., 150° C., 200° C., 300° C., 500° C., etc.).

Sizing the electrode S280 functions to modify a size and/or shape of the electrode and/or collector. S280 is typically performed after S260, but can be performed before and/or simultaneously with S260. The electrodes are preferably sized to approximately the same dimensions (e.g., have approximately the same area). The separator is preferably larger than the electrodes (e.g., larger in each direction orthogonal to parallel normals of broad faces of the electrodes such as by 1 mm, 2 mm, 3 mm, 5 mm, etc.; 1%, 2%, 5%, 10%, 20%, etc. of the electrode size; etc.). However, different electrodes can have different sizes. Similarly, the electrodes preferably fill the housing area (e.g., electrode area is about 80-95% of an internal area of the housing), which is beneficial for minimizing excess material and thereby increasing an energy density of the battery (e.g., by having less weight that does not contribute to the energy). However, the electrodes can fill any suitable portion of the housing interior.

The electrodes can be sized simultaneously and/or separately. Sizing the electrodes can include cutting the electrodes (e.g., using a cutter, die cutter, etc.), dinking the electrodes, tearing the electrodes, machining the electrodes, and/or any suitable steps or processes.

Assembling the battery S300 can function to attach the battery components together to form the battery. The battery can be assembled in line with (e.g., using a machine connected to) an electrode manufacturing machine and/or can be separate from the electrode manufacturing machine.

Figure 5:
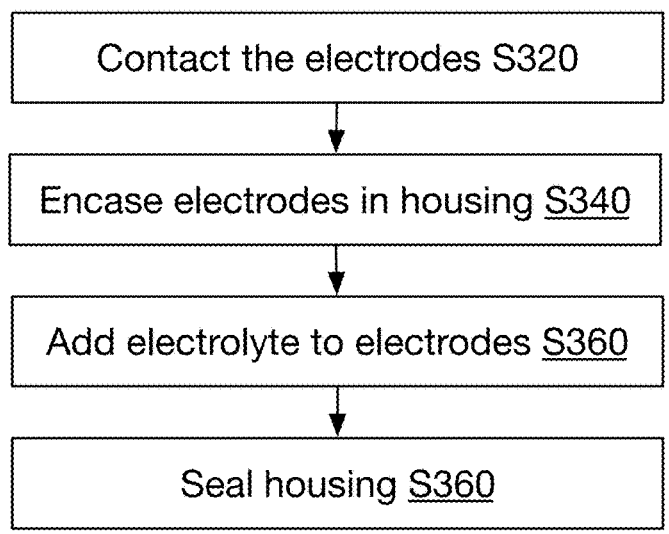
FIG. 5 is a schematic representation of a battery cell assembly process.

As shown for example in FIG. 5, assembling the battery cell can include: contacting the electrodes S320 (e.g., across a separator), enclosing the electrodes in a housing S340 (e.g., inserting the electrodes into, placing the electrodes into, surrounding the electrodes with, etc. the housing), adding electrolyte to the electrodes S360 (e.g., within the housing), sealing the housing S380, and/or any suitable steps.

Figure 3:
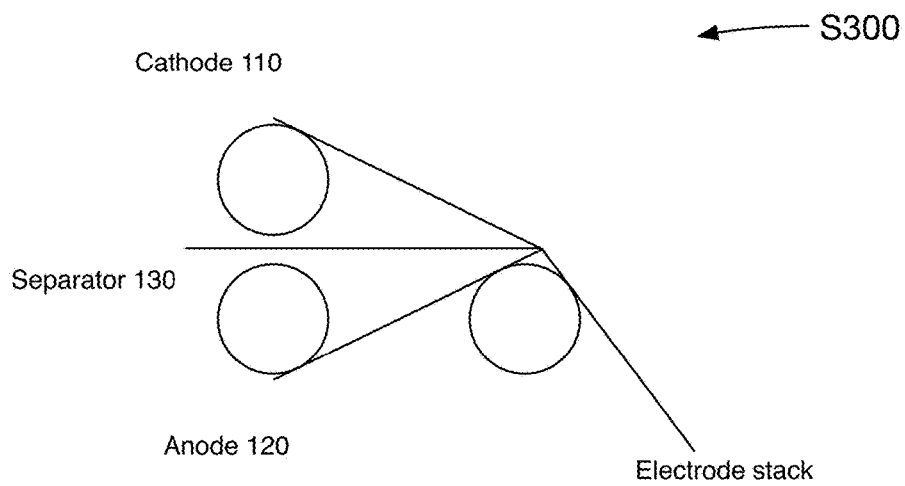
FIG. 3 is a schematic representation of an example of a roll to roll process.

The electrodes can be contacted S320 using a roll-to-roll process (e.g., as shown for example in FIG. 3), by stacking the electrodes (e.g., before or after cutting to size using a die cutter or other cutter), and/or otherwise be contacted.

The housing can be sealed S380 using sealing tape, welding, crimping, vacuum sealing, and/or any suitable sealing mechanism. The housing can be a pouch (e.g., to form a pouch cell), cylindrical (e.g., to form a cylindrical cell), prismatic (e.g., to form a prismatic cell), and/or have any suitable format. In some variants (e.g., for liquid electrolyte, for a semifluid electrolyte, etc.), the housing can be partially sealed (e.g., along 3 sides for a 4-sided housing) to form a volume that can hold the electrolyte. After electrolyte is added S340 (e.g., poured in, aliquoted in, etc.), the housing can be fully sealed. However, the housing can be sealed in any manner.

Figure 4A:
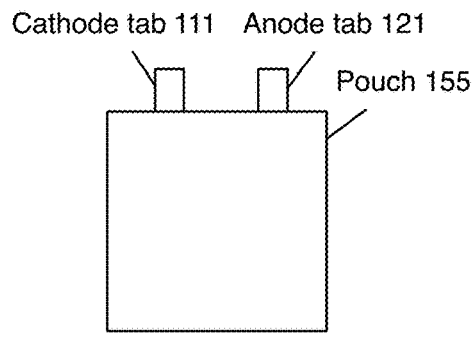
FIG. 4A is a schematic representation of an example of a pouch cell that includes tabs.
Figure 4B:
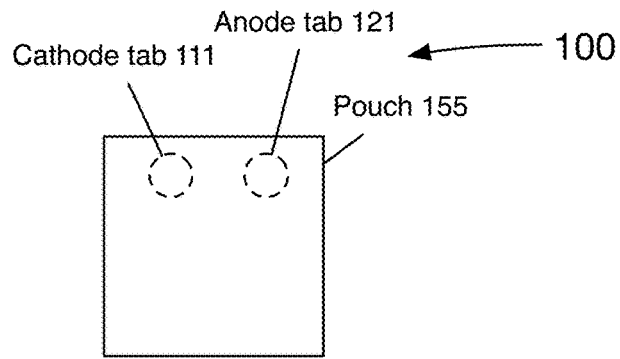
FIG. 4B is a schematic representation of an example of a tab-less pouch cell.

The electrodes can be connected to tabs (e.g., such as an aluminium tab in for the cathode and a nickel tab 121 for the anode which can function to allow the cell to connect to a load, other battery cells to form a pack, etc.) that extend outside of the battery housing (as shown for example in FIG. 4A) and/or form a tabless battery (e.g., as shown for example in FIG. 4B such as to enable electrical contact to be made through the battery housing). However, the electrodes can otherwise be contacted.

Figures 6A, 6B, 6C:
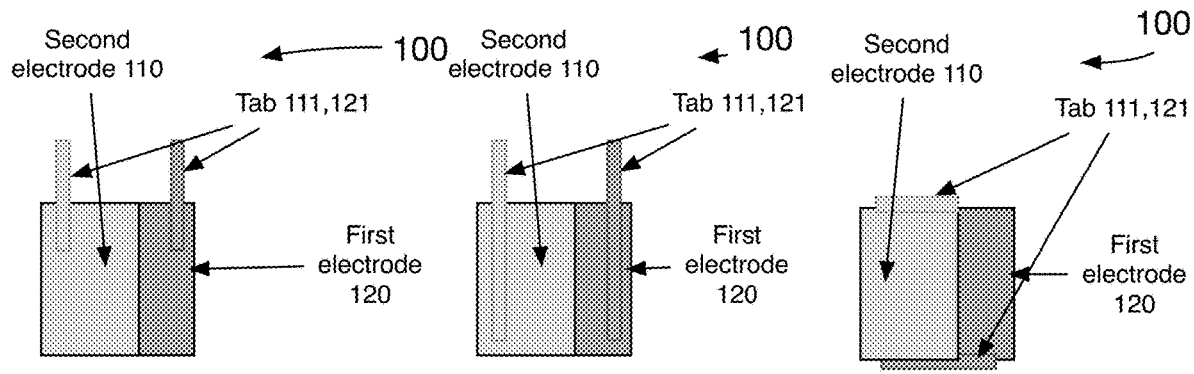
FIGS. 6A, 6B, and 6C are schematic representations of exemplary electrodes with different tab configurations.

The tabs for the electrodes can be on the same, adjacent, opposite, and/or any suitable sides of the battery and/or electrode. For example, as shown in FIG. 6A or FIG. 6B, the anode and cathode can have tabs on the same side of the battery. In another example, as shown in FIG. 6C, the anode and cathode can have tabs on opposite ends of the battery. However, the tabs can be arranged in any suitable portion of the battery and/or electrode (e.g., a plurality of sides).

The tabs can extend along approximately the full length of an electrode (e.g., as shown for example in FIG. 6B or FIG. 6C, length, width, diagonal dimension, diameter, etc.), along a predetermined extent of the electrode (e.g., as shown for example in FIG. 6A; such as 5%, 10%, 20%, 25%, 30%, 50%, 75%, values or ranges therebetween of the length, width, diagonal, diameter, etc.; such as 1 mm, 2 mm, 5 mm, 10 mm, 15 mm, 20 mm, 25 mm, 30 mm, 50 mm, 100 mm, values or ranged therebetween, etc.; etc.), and/or for any suitable extent of the battery. Having a tab that extends along approximately the full length of an electrode can be beneficial for providing greater contact area (e.g., between the tab and the electrode).

In some variants (e.g., for pouch batteries), there can be a predetermined space (typically between 10-15 mm, but it can be larger or smaller) between the cell electrode and pouch end. In some embodiments, it can be beneficial to reduce (e.g., minimize) the predetermined space to save overall space of the battery, reduce a weight of the battery, and/or can otherwise be beneficial. The predetermined space can be reduced, for example, using sonic or ultrasonic welders we can minimize a metal weld down to 2 mm, using a plastic or polymer adhesive weld (or heat seal) can reduce an adhesive connection down to 2-3 mm (e.g., when we seal the cell after adding electrolyte). Typically, excess space (on the order of about 500 um-1 mm, but can be smaller than 500 µm or larger than 1 mm) of extra space is retained for the separator so it covers the edge of the electrodes. As a result, a battery can have a predetermined space down to 5 mm (or potentially smaller; as shown for example in FIG. 6). The adhering (e.g., welding) steps can be performed with one machine or a plurality of different machines. The adhering steps can be performed manually (e.g., by hand) or automatically (e.g., in a roll to roll process). In some variations, plastic welding on the edges of the battery can be used to reduce the excess foil on the sides (e.g., reducing the excess foil from 3-5 m down to 2 mm or less). Reducing the amount of excess foil and/or predetermined space can increase the Wh/L or Wh/kg of the cell (e.g., by less than 0.01%, 0.01%, 0.1%, 1%, 10%, values therebetween, etc.). Plastic welding can additionally be beneficial as it can be performed at low temperatures (e.g., room temperature, less than about 0° C., 10° C., 20° C., 50° C., 100° C., etc.) avoiding potential problems resulting from heating the battery (and/or constituents thereof).

Conditioning the battery S400 can function to modify (e.g., extend) a lifetime of the battery. For example, conditioning the battery can increase and/or decrease a charge state of the battery (e.g., state of charge) to protect the battery from battery aging conditions. For instance, when a temperature (or an expected temperature such as a temperature swing anticipated during shipping or transportation) is greater than a threshold temperature, the battery can be discharged to decrease aging of the battery. However, the battery can be conditioned in response to any suitable situation (e.g., environment, battery state, etc.) and/or the battery can not be conditioned.

Assessing a quality of the battery S500 functions to measure one or more battery property (particularly with a goal of ensuring batteries are consistent between instances of the method such as instances using different batches of electrode materials). Battery properties can include: electrode thickness, electrode capacity, energy density, lifetime, state of charge, state of health, state of power, voltage (e.g., open circuit voltage, instantaneous voltage, etc.), current (e.g., short circuit current, instantaneous current), temperature, impedance, thermodynamic properties (e.g., entropy, enthalpy, etc.), and/or any suitable properties. For example, assessing a quality of the battery(s) can include charging and/or discharging the battery at one or more charging rates while measuring the battery property (and/or measuring a property correlated with the battery property). However, the quality of the battery can otherwise be assessed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for manufacturing a battery comprising:
   casting a wet anode film from a slurry, wherein the slurry comprises:
   at most about 15% binder by mass;
   at most about 20% conductive additive by mass; and
   between about 65% and 80% active material by mass, wherein the active material comprises:
   between about 30% and 50% silicon particles by mass, wherein the silicon particles comprise a vermiform morphology, wherein the silicon particles comprise nanoparticles with a characteristic size between about 2 and 150 nm, wherein the nanoparticles form silicon clusters with a characteristic cluster size between about 1 and 5 µm; and
   between about 50% and 70% graphite particles by mass;
   drying the wet anode film to produce a dry anode film;
   densifying the dry anode film to produce an anode;
   contacting the anode and a cathode across a separator;
   enclosing the anode, the cathode, and the separator in a housing;
   adding electrolyte to the housing; and
   sealing the housing.

2. The method of claim 1, wherein the graphitic particles are spheroidal with a diameter between about 10 and 50 µm.

3. The method of claim 1, wherein the dry anode film comprises about 70% active material by mass, 20% conductive material by mass, and 10% binder by mass.

4. The method of claim 1, wherein the conductive additive comprises C65, and wherein the binder comprises polyacrylonitrile.

5. The method of claim 1, wherein an N/P ratio of the anode to the cathode is between about 1 and 1.1.

6. The method of claim 1, wherein the silicon particles are manufactured by reducing fumed silica.

7. The method of claim 1, wherein the silicon clusters are agglomerated into agglomerates with a characteristic agglomerate size between about 2 and 50 μm.

\* \* \* \* \*